United States Patent Office 3,408,410
Patented Oct. 29, 1968

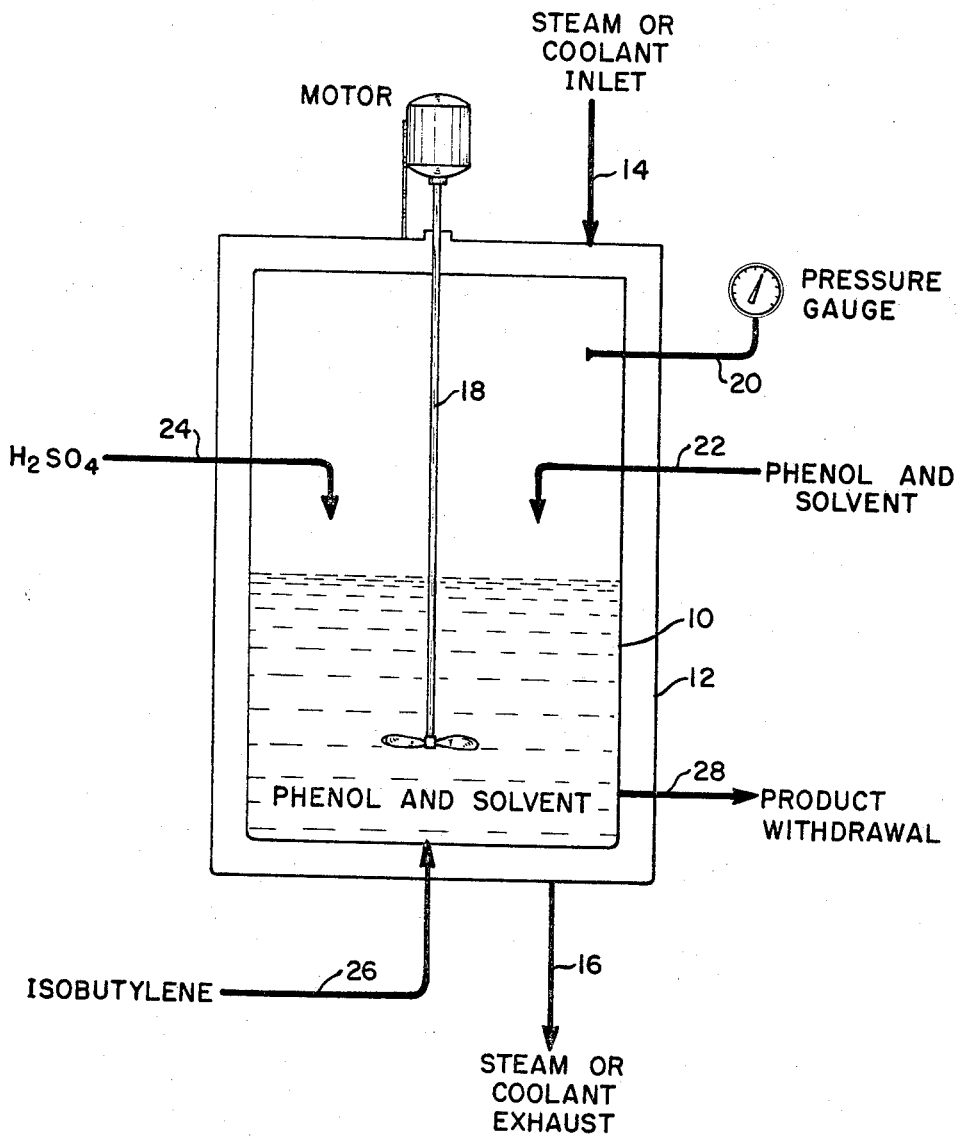

3,408,410
ORTHO-TERTIARY BUTYLATION OF PHENOL
Robert J. Laufer and Metro D. Kulik, Pittsburgh, Pa., assignors to Consolidation Coal Company, Pittsburgh, Pa., a corporation of Pennsylvania
Continuation-in-part of application Ser. No. 359,038, Apr. 13, 1964. This application July 28, 1965, Ser. No. 477,653
7 Claims. (Cl. 260—624)

ABSTRACT OF THE DISCLOSURE

An improved process for the tertiary-butylation of either phenol or 2-tertiary-butylphenol, in which preferentially ortho-substitution is obtained by adding the sulfuric acid catalyst in successive increments during the course of the reaction.

---

This application is a continuation-in-part of our co-pending application, Ser. No. 359,038, filed Apr. 13, 1964, now abandoned, and assigned to the assignee of the present application.

The invention described herein relates to the selective ortho-tertiary butylation of phenol and of 2-tertiary-butylphenol, or mixtures thereof.

The ortho-tertiary-butylphenols, 2-tertiary-butylphenol and 2,6-di-tertiary-butylphenol, have considerable industrial utility as antioxidants for gasoline. They are normally prepared by reacting phenol with isobutylene in the presence of an alkylation catalyst. Since most of the commonly used alkylation catalysts promote para-substitution by the t-butyl group, there has been an intensive search for catalysts that promote selective ortho-substitution, and with some success. For example, aluminum phenoxide (U.S. Patent No. 2,831,898) is an effective ortho- directing catalyst, with yields of up to 85 to 90 percent of ortho-substituted products based on converted phenol. The use of aluminum thiophenoxide (U.S. Patent No. 3,032,595) as the alkylation catalysts results in correspondingly high yields of ortho-substituted products. However, both of these catalysts involve costly preparation and removal procedures which at least partially offset the gains resulting from the high yields of the desired products.

Sulfuric acid is a well-known alkylation catalyst. In contrast to aluminum phenoxide or thiophenoxide, it is commercially available and inexpensive, and presents no problems of removal at the end of the reaction. However, it has not found commercial acceptance as a catalyst for the ortho-tertiary-butylation of phenol because of the widely held view that it preferentially promotes para-substitution. This view is reflected in the following statement appearing in U.S. Patent No. 3,116,336, issued Dec. 31, 1963 and assigned to Shell Oil Company: "This discovery (i.e., the use of sulfonic acids) is, of course, surprising in view of the extensive showing in the art that when sulfuric acid is employed to catalyze the alkylation of phenols with olefins, the first and principal product is the 4-alkylphenol, the ortho position being difficult to substitute even after the para position has been filled." (Parenthetical insertion ours.) Then again in British Patent No. 856,458, published Dec. 14, 1960 and assigned to Ethyl Corporation, appears the statement on page 2, line 94 et seq.: "For example, when phenol and isobutylene are reacted in the presence of sulfuric acid (or other condensing agents, such as phosphoric acid, anhydrous aluminum chloride, boron trifluoride, ferric chloride, or hydrogen chloride), para-alkylation is so predominant that the reaction mixture comprises largely para-tert.-butylphenol, 2,4 - di-tert.-butylphenol and 2,4,6-tri-tert.-butylphenol. *In fact, 2,6-di-tert.-butylphenol cannot be prepared in this manner.* Thus, these prior processes using sulfuric acid or the other condensing agents provide reaction mixtures which are entirely different and which are solid at ordinary temperatures." (Italics ours.) This same statement appears in U.S. Patent No. 3,166,509, issued Jan. 19, 1965 to Ethyl Corporation.

The primary object of this invention is to provide a commercially feasible process in which sulfuric acid is used as the catalyst for the selective ortho-tertiary butylation of phenol and of 2-tertiary-butylphenol, or of mixtures thereof.

In accordance with our invention, we have provided a process for the selective ortho-tertiary-butylation of a phenol selected from the class consisting of phenol itself and 2-tertiary-butylphenol. The process comprises, in its broadest aspect, the following essential steps:

(1) introducing the phenolic feedstock into a butylation zone,
(2) initially adding sulfuric acid to said phenolic feedstock in an amount between .02 and 0.1 percent by weight of said feedstock,
(3) maintaining the temperature of the butylation zone between 75 and 140° C. during the course of the reaction,
(4) introducing isobutylene into the butylation zone at such a rate that substantially all the isobutylene is absorbed by the phenolic feedstock as fast as it is introduced,
(5) adding successive increments of sulfuric acid during the course of the reaction to maintain the rate of absorption of the isobutylene.

We have found that the above-defined process will yield a product which, exclusive of the unreacted feedstock, contains at least 60 mole percent of ortho-tertiary-butylphenols. Thus, a process is provided, using sulfuric acid as a catalyst, which is a commercially feasible process for making either 2-tertiary-butylphenol or 2,6-di-tertiary-butylphenol, or both.

For a better understanding of our invention, its objects and advantages, reference should be made to the following description and to the drawing which is a schematic drawing of a reactor in which the butylation of phenol may be conveniently conducted in accordance with this invention.

Referring to the drawing, there is shown schematically a reactor in which the process may conveniently be practiced. The process will now be generally described in connection with this schematically shown reactor. However, the specific features of the process which are essential to its successful practice will be later described in detail. The reactor 10 is surrounded by a jacket 12 to which steam or cooling fluid may be supplied through a conduit 14 and from which steam or cooling fluid is exhausted through conduit 16. The steam provides the heat for maintaining the desired temperature within the reactor. The reactor is also provided with a motor driven stirrer 18 for agitating the reaction mixture, and with a pressure gauge 20 for following the rate of absorption of the isobutylene. A thermometer (not shown) is also provided to record the temperature within the reactor.

The reactor is charged with the phenol solution and the sulfuric acid in weighed amounts through conduits 22 and 24 respectively. The temperature of the vigorously stirred mixture is raised to the desired level by the passage of steam through jacket 12. Isobutylene is metered into the reactor through a conduit 26 at a rate which permits complete absorption of the isobutylene by the phenol solution under the operating conditions. During the first few minutes the system is vented in order to sweep air from the free space. The remainder of the reaction is conducted in a closed system and the pressure measured by the gauge 20. Since the reaction is exothermic, it sometimes is necessary to cool the reactor. This may be accomplished by discontinuing the flow of steam through jacket 12 and, if necessary, by passing cold water through the jacket in place of steam. The reaction is allowed to continue until a steady, but relatively rapid rise in pressure shows that the rate of absorption of the isobutylene is less than the feed rate, whereupon an incremental addition of sulfuric acid is made. Several of such additions may be required during the course of the reaction to maintain the desired rate of absorption. The feed of isobutylene is discontinued when a predetermined amount has been added. After such discontinuance, the reaction mixture is maintained at the same elevated temperature for a half-hour or so to permit at least some of the ethers to convert to ring-alkylated products, and at least some of the tri-substituted phenol to convert to ortho-alkylated products. A small excess of aqueous caustic is then added to the stirred reaction mixture to neutralize the sulfuric acid. The product is withdrawn from the reactor through a line 28 for distillation to recover the products.

As previously pointed out, the improved results obtained by our process are attributable to the combination of four features of the process, and not to any one alone. Those features are (1) temperature, (2) total amount of sulfuric acid, (3) the incremental addition of sulfuric acid during the course of the reaction, in contrast to addition of all the acid at the beginning, and (4) the use of a non-polar hydrocarbon as a solvent for the phenol. These features will now be separately discussed in detail.

1.—Temperature

The ortho-butylation of phenol was investigated with 96 percent sulfuric acid as the catalyst over the reaction temperature range of 25 to 160° C. Phenol was first dissolved in a non-polar hydrocarbon solvent, generally toluene, but sometimes meta-xylene, pseudocumene, or iso-octane. So long as such a solvent was employed, the particular solvent made no significant difference. The weight ratio of solvent to phenol was 0.39. The mole ratio of isobutylene (total added during the reaction) to phenol was about 1.5. In accordance with this invention, the catalyst was added in several increments during the reaction to maintain a constant isobutylene absorption rate. The reaction mixture was sampled and analyzed by vapor phase chromatography every 15–30 minutes. The product composition is reported below in Table I for about 60 percent conversion of phenol at different temperatures. The phenol conversion of about 60 percent was selected for the purpose of reporting since it gave in general the optimum distribution of ortho-substituted phenols. The product distribution is expressed as mole percent of the product exclusive of unconverted phenol. In the interest of simplifying the column headings, the names of the products have been abbreviated in Table I and sometimes in ensuing tables as follows: The term "Ether" refers to tertiary-butyl phenyl ether and tertiary-butyl, tertiary-butylphenyl ether. 2-tertiary-butylphenol is identified as 2-t; 2,6-di-tertiary-butylphenol, as 2,6-di-t; 4-tertiary-butylphenol, as 4-t; 2,4-di-tertiary-butylphenol, as 2,4-di-t; and 2,4,6-tri-tertiary-butylphenol, as 2,4,6-tri-t.

TABLE I.—EFFECT OF TEMPERATURE

| Run No. | Temp., °C. | Product Distribution, mole percent | | | | | |
|---|---|---|---|---|---|---|---|
| | | Ether | 4-t | 2-t | 2,6-di-t | 2,4-di-t | 2,4,6-tri-t |
| 999-36 | 25 | 65.8 | 5.6 | 18.0 | 3.0 | 5.5 | 2.1 |
| 999-33 | 60 | 15.6 | 3.9 | 33.9 | 15.9 | 14.4 | 16.4 |
| 999-19 | 90 | 3.6 | 2.7 | 45.0 | 18.1 | 16.4 | 14.2 |
| 999-130 | 130 | 0 | 5.8 | 63.2 | 6.1 | 21.6 | 3.3 |
| 999-38 | 160 | 2.4 | 26.7 | 54.7 | 2.3 | 13.2 | 0.7 |

It will be noted in the above Table I that at the low temperatures, namely 25 and 60° C., the production of the ethers is excessive, but drops sharply between 60 and 90° C. At high temperatures, i.e. 160° C., the production of the undesired para-tertiary-butylphenol (4-t) jumps dramatically. On the other hand, at 90 and 130° C., ortho-substitution is obviously promoted under the conditions of the reaction.

2.—Total amount of sulfuric acid

Ortho-butylation of phenol is promoted by use of very small amounts of sulfuric acid. In fact, it is essential that the total amount of acid (expressed as $H_2SO_4$) be less than 0.5 percent by weight of the phenol charged to the reactor. The following Table II tabulates the yield of para-t-butylphenol for different amounts of acid, and shows the increase of such undesired product with increase in amount of acid. In the tabulated runs, the phenol was dissolved in toluene; and the butylation was conducted at 90° C. The phenol conversion in each run was about 32 percent. The yield of para-tertiary-butylphenol is expressed as mole percent of the total product exclusive of unconverted phenol.

TABLE II.—EFFECT OF ACID (TOTAL AMOUNT)

| Run No. | Distribution of para-substituted phenols, mole percent | |
|---|---|---|
| | Catalyst, wt. percent of phenol | Para-t-butyl phenol |
| 984-92 | 0.02 | 8.5 |
| 984-90 | 0.13 | 16.3 |
| 999-56 | 1.00 | 24.6 |

3.—Effect of incremental addition of sulfuric acid

In order to obtain the improved results of our invention, it is essential that the sulfuric acid be added in increments during the course of the reaction instead of all at the beginning. Preferably, in the case of the butylation of phenol, each increment is less than .05 weight percent of phenol, and is added whenever the rate of absorption of the isobutylene drops below a predetermined value. The addition of each increment restores the absorption rate to the desired level. The following Table III shows the comparative effect upon yield of para-tertiary-butylphenol of incremental addition and single addition, the total amount of acid added being below 0.5 percent by weight of phenol. The sulfuric acid catalyst was 96 percent $H_2SO_4$. In Run 999–19, the acid was added in four successive increments of nearly .05 percent by weight of phenol for a total of .18 weight percent.

TABLE III.—EFFECT OF INCREMENTAL ADDITION ACID

| Run No. | Catalyst, wt. percent of phenol | Mole percent of para-t-butylphenol |
|---|---|---|
| 999-19 | 0.05-0.18 | 2.7 |
| 984-90 | 0.13 | 16.3 |

4.—Effect of solvent

We have found that the use of a non-polar hydrocarbon solvent greatly improves the yield of ortho-substituted products. The selected solvent must be one which is liquid under the conditions of the reaction. Examples of suitable solvents are toluene, meta-xylene, pseudocumene, iso-octane, hexane, cyclohexane and n-heptane. Even though the solvent is one which itself is normally alkylatable under the conditions of the instant reaction, we have observed little or no alkylation of the solvent so long as the reaction is discontinued before all the phenol is converted. It is evident that the alkylation of phenol proceeds under the instant conditions at a comparatively rapid rate. The following Table IV tabulates the results obtained where solvent was employed and where no solvent was employed. It should be noted that the conditions selected were those set forth above as most favorable to ortho-substitution so as to compare the use of solvent with a solvent-free system under otherwise optimum conditions for ortho-substitution. The butylation in each case was conducted at 90° C. The acid used as catalyst was 96 percent $H_2SO_4$. The mole ratio of isobutylene to phenol was about .55 and the weight ratio of solvent to phenol was about .35. The conversion of phenol was in each instance about 32 percent. The amount of acid used was about .05 percent by weight of phenol in the case of the solvent-free system, while it was slightly more than twice that for the solvent systems. However, this comparatively lower amount of acid in the solvent-free system should, as we have seen above, favor ortho-substitution— and it does—but not as much as the use of solvent.

TABLE IV.—EFFECT OF SOLVENT

| Run No. | Solvent | Product distribution, mole percent | | | | |
|---|---|---|---|---|---|---|
| | | 2-t | 2,6-di-t | 4-t | 2,4-di-t | 2,4,6-tri-t |
| 999-58 | None | 43.9 | 1.3 | 27.5 | 24.0 | 3.4 |
| 999-17 | Iso-octane | 51.1 | 6.6 | 16.8 | 21.1 | 4.4 |
| 984-90 | Toluene | 60.8 | 6.3 | 16.3 | 16.3 | 0.3 |

It is clear from the above Table IV that the use of solvent increases the mole percent of total ortho-substituted products by more than 10 percentage points.

There are other reaction conditions than those discussed above which have some influence on the distribution of products, but not to the same extent as those discussed. The mole ratio of total isobutylene to phenol may vary over a wide range, namely from about 0.5 to about 2.5. The pressure, while preferably atmospheric, may be higher, and must be higher if a solvent is employed such as hexane or heptane, which otherwise would not be liquid over the entire temperature range specified for the reaction. The concentration of the aqueous sulfuric acid, while preferably at least 90 percent, need not be, since we have found that essentially the same results are obtained at concentrations as low as 50 percent, and lower.

Example 1

This example is given as illustrative of the preferred embodiment of our invention as applied to the butylation of phenol. It shows the production of a high yield of ortho-substituted products over a surprisingly broad range of phenol conversion. The reaction was carried out in a one-liter four-necked flask equipped with a powered stirrer, a thermometer, an inlet gas bubble tube arranged to extend below the surface of liquid in the flask, and an outlet tube extending to a vent valve and an open-end manometer for indicating gas absorption or pressure build-up in the flask. The isobutylene was metered by a flow rator as it was fed from a portable bomb. The charge to the flask was as follows:

Phenol _____grams__ 443.0
96% $H_2SO_4$ _____gram__ 0.22
Dry toluene _____ml__ 200

The stirrer was started and the temperature was raised to and maintained at 90° C. by heating the flask as required with a Glascol mantle. The isobutylene was introduced through the flowrator and into the charge via the bubble tube. Phenol conversion and product distribution were determined at intervals of time as the butylation progressed. The rate of isobutylene input was held substantially constant. The amount fed was such as to permit complete absorption. However, as the reaction progressed, a point was reached where the pressure in the system as indicated by the manometer gradually increased. At this point, another increment of 96 percent sulfuric acid was added. The pressure dropped to atmospheric immediately and remained there until another gradual rise in pressure was observed. During the course of the reaction, there were three such additions of 96 percent sulfuric acid in the amounts of 0.20 gram, 0.16 gram, and 0.20 gram, making a total including the initial charge of 0.78 gram. When 425 grams of isobutylene had been added, the feed of isobutylene was stopped. To the mixture was added sufficient 50 percent NaOH to neutralize the acid.

In Table V below are tabulated the phenol conversions and product distributions (in mole percent) obtained from samples extracted from the reaction flask during the course of the reaction.

TABLE V.—RUN NO. 999-19

| Sample No. | Phenol Conversion | Ether | 2-t | 2,6-di-t | 4-t | 2,4-di-t | 2,4,6-tri-t |
|---|---|---|---|---|---|---|---|
| 1 | 59.8 | 10.6 | 47.4 | 13.4 | 5.2 | 14.4 | 9.0 |
| 2 | 62.8 | 7.2 | 47.8 | 14.5 | 4.3 | 13.8 | 12.4 |
| 3 | 63.5 | 3.6 | 45.0 | 18.1 | 2.7 | 16.4 | 14.2 |
| 4 | 67.6 | 3.3 | 42.4 | 18.2 | 5.9 | 16.0 | 14.2 |
| 5 | 72.6 | 6.9 | 40.1 | 19.3 | 3.3 | 14.9 | 15.5 |
| 6 | 74.3 | 5.0 | 36.1 | 21.9 | 2.4 | 15.5 | 19.1 |
| 7 | 79.3 | 5.9 | 33.8 | 24.1 | 1.8 | 13.0 | 21.4 |
| 8 | 81.2 | 5.4 | 31.8 | 26.0 | 1.5 | 13.3 | 22.0 |

Example 2

2-tertiary-butylphenol and toluene were heated to 90° C. and concentrated sulfuric acid (0.059 weight percent of the 2-tertiary-butylphenol) was added. Isobutylene was then introduced at a maximum rate of 0.9 lb./hr./lb. of 2-tertiary-butylphenol. The molar ratio of isobutylene to 2-tertiary-butylphenol was 1.28 or approximately 0.48 pound of isobutylene per pound of 2-tertiary-butylphenol. The temperature was held at 90±2° C. throughout the run. The reaction is not strongly exothermic. When approximately 36 weight percent of the isobutylene had been fed, another injection of concentrated sulfuric acid was made (0.059 weight percent of the 2-tertiary-butylphenol charged). Further additions of concentrated sulfuric acid were made according to the following schedule:

TABLE VI

| Percent of Total Isobutylene in | Concentrated $H_2SO_4$* |
|---|---|
| 52 | 0.059 |
| 62 | 0.059 |
| 67 | 0.059 |
| 71 | 0.110 |
| 84 | 0.110 |
| 100 | 0.110 |

* Weight percent of 2-tertiary-butylphenol.

In the course of the reaction, eight sulfuric acid additions were used. It is not essential that such a schedule be adhered to rigidly. However, it is essential to observe the following rules: (1) do not add all the sulfuric acid at one time (if this rule is not observed, para-substitution will be promoted), (2) add the sulfuric acid when the rate of reaction falls off, and (3) keep the sulfuric acid concentration as low as possible.

After all the isobutylene had been introduced, the reactants were held at 90±2° C. for 30 minutes. The catalyst was then neutralized with sodium hydroxide dissolved in a minimum amount of water. The product was fractionally distilled. The following Table VII tabulates the reaction conditions and the results of the run.

TABLE VII.—BUTYLATION OF 2-t-BUTYLPHENOL

| Run No. | 1095-24 |
|---|---|
| Feed (lbs.) | 118.0 |
| 2-t-butylphenol in Feed (lbs.) | 113.2 |
| 2-t-butylphenol in Feed (lb.-moles) | 0.75 |
| Isobutylene (lbs.) | 57.0 |
| Isobutylene (lb.-moles) | 1.02 |
| Isobutylene: 2-t-butylphenol (moles) | 1.35 |
| Toluene (lbs.) | 26.0 |
| Toluene (lb.-moles) | 0.28 |
| Conc. $H_2SO_4$ (wt. percent of feed): | |
| I | 0.059 |
| II | 0.059 |
| III | 0.059 |
| IV | 0.059 |
| V | 0.059 |
| VI | 0.110 |
| VII | 0.110 |
| VIII | 0.110 |
| Reaction Temperature (° C.) | 90±2 |
| Reaction Time (hrs.) | 8.0 |
| Total Product (lbs.) | 197.0 |
| Toluene-Free Product (lbs.) | 165.6 |

TABLE VII—Continued

COMPOSITION OF TOLUENE-FREE PRODUCT

| Weight Percent: | | (Feed) |
|---|---|---|
| Light Ends | 5.5 | |
| Phenol | 0.5 | 1.7 |
| 2-t-butylphenol | 9.3 | 95.9 |
| 4-t-butylphenol | 0.0 | 0.7 |
| 2,6-di-t-butylphenol | 54.9 | 1.3 |
| 2,4-di-t-butylphenol | 4.0 | |
| 2,4,6-tri-t-butylphenol | 25.8 | |
| Unidentified | | 0.4 |
| Conversion (wt. percent of 2-t-butylphenol) | 86.6 | |

CONVERSION TO VARIOUS PRODUCTS

| Mole percent of Converted 2-t-butylphenol: | |
|---|---|
| 2,6-di-t-butylphenol | 67.4 |
| 2,4-di-t-butylphenol | 4.9 |
| 2,4,6-tri-t-butylphenol | 25.0 |

Example 3

The phenolic feedstock used in this example was a fraction of the product obtained by butylating phenol as in Example 1, and had the following composition, expressed as percent by weight:

| | |
|---|---|
| Toluene | 1.3 |
| Phenol | 25.7 |
| Neutral oil | 5.1 |
| 2-tertiary-butylphenol | 54.1 |
| 4-tertiary-butylphenol | 4.6 |
| 2,6-di-tertiary-butylphenol | 3.5 |
| 2,4-di-tertiary-butylphenol | 0.7 |
| 2,4,6-tri-tertiary-butylphenol | 1.5 |

The phenolic feed stock (10,971 lbs.) dissolved in toluene (3,600 lbs.) was reacted with isobutylene (6,700 lbs.) at about 92° C. in the presence of concentrated sulfuric acid added in seven successive increments of 5 lbs. each to maintain the desired reaction rate. The composition of the product was determined to be as follows, expressed as percent by weight:

| | |
|---|---|
| Phenol | 6.7 |
| Neutral oil | 3.4 |
| 2-tertiary-butylphenol | 19.5 |
| 4-tertiary-butylphenol | 0.9 |
| 2,6-di-tertiary-butylphenol | 37.9 |
| 2,4-di-tertiary-butylphenol | 6.7 |
| 2,4,6-tri-tertiary-butylphenol | 23.1 |

This product may be fractionally distilled to recover the 2,6-di-tertiary-butylphenol in high purity, i.e. 90+9 percent.

Example 4

This example describes two experiments in which 2-tertiary-butylphenol was butylated under very similar reaction conditions, but which employed different modes of adding the catalyst. In Run 1131–95, concentrated sulfuric acid was added in several increments as required to maintain a predetermined rate of olefin absorption. This experiment yielded 2,6 - di - tertiary-butylphenol as the major product even at conversions above 80 percent. The other experiment (Run 1131–97) used initially the cumulative total of acid employed during Run 1131–95. Isobutylene was fed at the same rate as in Run 1131–95 and the same final conversion of 2-tertiary-butylphenol was reached. However, the yield of 2,6-di-tertiary-butylphenol was drastically reduced. Thus, it can be concluded that incremental catalyst addition is required for optimum conversion of 2 - tertiary-butylphenol to 2,6-di-tertiary-butylphenol with a minimum reaction time and efficient use of isobutylene.

In each experiment, the butylation was carried out in a two-liter flask provided with a thermometer, reflux condenser, stirrer, sparge tube with appropriate traps, a gas flowrator, manometer, and heating mantle. The flask was charged with 451 grams of redistilled 2-tertiary-butylphenol (99.1% by gas chromatography analysis). The temperature was raised to 90° C.; while the flask contents were stirred, the desired amount of concentrated sulfuric acid was added. Isobutylene was sparged from a tarred cylinder into the stirred 2-tertiary-butylphenol at a constant rate of 5 flowrator units (equivalent to 40 grams of isobutylene per hour). Internal flask pressure of isobutylene was limited to a maximum 30 mm. Hg gauge by periodically venting excess isobutylene to the atmosphere. A sample of the reaction product was taken after every 40 grams of isobutylene was charged. The experiments were arbitrarily terminated after 200 grams of olefin had been charged. The samples were analyzed by gas chromatography (10 ft. silicone oil column, 190 C.), and product distribution and the conversion of 2-tertiary-butylphenol were calculated from the peak areas.

The conditions and results of the two experiments are summarized in the following Tables VII and IX.

TABLE VIII.—ORTHO-TERTIARY BUTYLATION OF 2-t-BUTYLPHENOL

| Run No. | Time, (hrs.) | Isobutylene Chg'd (gms.) | Catalyst Addns. (gms.) | Conversion of 2-t-butyl-phenol (percent) |
|---|---|---|---|---|
| 1131–95 | 0.0 | 0 | 0.23 | 0 |
| | 1.8 | 40 | 0.23 | 22.3 |
| | 2.2 | 80 | | 40.4 |
| | 2.9 | 120 | 0.23 | 61.2 |
| | 3.6 | 130 | 0.23 | |
| | 4.2 | | 0.23 | |
| | 4.5 | 160 | | 71.7 |
| | 4.7 | | 0.23 | |
| | 5.4 | | 0.23 | |
| | 5.6 | 200 | | 81.1 |
| Total | | | 1.61 | |
| 1131–97 | 0.0 | 0 | 1.61 | 0 |
| | 1.1 | 40 | | 28.1 |
| | 2.2 | 80 | | 44.1 |
| | 3.5 | 120 | | 58.9 |
| | 4.3 | 160 | | 71.4 |
| | 5.4 | 200 | | 82.4 |

TABLE IX.—PRODUCT DISTRIBUTION
[Mole percent]

| Run No. | Phenol | 2,6-Bu$_2$ Phenol | 2,4-Bu$_2$ Phenol | 2,4,6-Bu$_3$ Phenol | Ethers |
|---|---|---|---|---|---|
| 1131–95 | 3.9 | 71.2 | 17.3 | 5.5 | 1.7 |
| | 1.9 | 69.8 | 16.2 | 9.6 | 2.5 |
| | 0.6 | 68.6 | 12.1 | 17.6 | 1.2 |
| | 0.3 | 66.0 | 11.5 | 20.8 | 1.4 |
| | 0.2 | 62.7 | 8.8 | 26.7 | 1.6 |
| 1131–97 | 13.2 | 38.4 | 42.4 | 6.0 | |
| | 10.0 | 28.8 | 44.4 | 14.7 | 2.1 |
| | 4.2 | 37.4 | 34.6 | 22.4 | 1.4 |
| | 2.8 | 38.4 | 27.8 | 30.1 | 0.9 |
| | 1.6 | 34.3 | 15.7 | 47.1 | 1.3 |

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. A process for the selective ortho-tertiary butylation of a phenolic feedstock containing at least one phenol selected from the class consisting of phenol itself and 2-tertiary-butylphenol which comprises, in combination, the following steps:
   (a) introducing the phenolic feedstock into a butylation zone,
   (b) initially adding sulfuric acid to said phenolic feedstock in an amount between .02 and 0.1 percent by weight of said feedstock,
   (c) maintaining the temperature of the butylation zone between 75 and 140° C. during the course of the reaction,
   (d) introducing isobutylene into the butylation zone at such a rate that substantially all the isobutylene is absorbed by the phenolic feedstock as fast as it is introduced, (e) adding successive increments of sulfuric acid to said phenolic feedstock during the course of the reaction as required to maintain the rate of absorption of the isobutylene, and (f) discontinuing the introducing of isobutylene before all the butylatable feedstock has been reacted.

2. The process according to claim 1 in which the feedstock is phenol.

3. The process according to claim 1 in which the feedstock is 2-tertiary-butylphenol.

4. The process according to claim 1 in which the feedstock is a mixture of phenols containing phenol and 2-tertiary-butylphenol.

5. A process for the selective ortho-tertiary butylation of phenol which comprises, in combination, the following steps:

(a) providing a solution of phenol in a non-polar hydrocarbon solvent in a butylation zone, (b) initially adding sulfuric acid to said solution in an amount between .02 and 0.1 percent by weight of said phenol, (c) heating said solution to a temperature between 75 and 140° C. and maintaining the temperature in that range during the course of the reaction, (d) introducing isobutylene into said solution at such a rate that substantially all the isobutylene is absorbed as fast as it is introduced, (e) adding successive increments of sulfuric acid to said solution during the course of the reaction as required to maintain a substantially complete absorption of the isobutylene by said solution, and (f) discontinuing the introduction of isobutylene before all the phenol has been reacted and before an aggregate amount of sulfuric acid equal to 0.5 percent by weight of the phenol has been added.

6. The process according to claim 5 in which the solvent is toluene.

7. The process according to claim 5 in which the sulfuric acid is aqueous sulfuric acid having a concentration of at least 90 percent $H_2SO_4$.

References Cited

UNITED STATES PATENTS

| | | | |
|---|---|---|---|
| 2,051,473 | 8/1936 | Evans et al. | 260—624 |
| 2,189,805 | 2/1940 | Kyrides et al. | 260—624 |
| 2,414,764 | 1/1947 | Pfenning | 260—624 |
| 3,177,259 | 4/1965 | Winkle | 260—624 |
| 1,972,599 | 9/1934 | Perkins et al. | |
| 2,831,898 | 4/1958 | Eckes et al. | |
| 3,032,595 | 5/1962 | Neuworth et al. | |
| 3,116,336 | 12/1963 | Van Winkle. | |
| 3,166,509 | 1/1965 | Eckes et al. | |

FOREIGN PATENTS 856,458   12/1965   Great Britain.

LEON ZITVER, *Primary Examiner.*

W. B. LONE, *Assistant Examiner.*